United States Patent [19]

Theodore et al.

[11] Patent Number: 4,568,473

[45] Date of Patent: Feb. 4, 1986

[54] AMINE BEARING POLYMERIC PARTICLES AS ACID NEUTRALIZERS FOR ENGINE OILS

[75] Inventors: Ares N. Theodore, Farmington Hills; Mohinder S. Chattha, Livonia, both of Mich.

[73] Assignee: Ford Motor Company, Dearborn, Mich.

[21] Appl. No.: 689,402

[22] Filed: Jan. 7, 1985

[51] Int. Cl.$^4$ .............................................. C10M 1/28
[52] U.S. Cl. ........................ 252/51.5 R; 252/51.5 A; 523/436; 523/437; 523/463; 524/523; 524/923
[58] Field of Search ............... 252/51.5 R, 51.5 A; 524/523, 923; 523/436, 437, 463

[56] References Cited

U.S. PATENT DOCUMENTS

| 3,317,635 | 5/1967 | Osmond et al. | 525/296 |
|---|---|---|---|
| 3,383,352 | 5/1968 | Duell et al. | 523/344 |
| 3,607,821 | 9/1971 | Clark et al. | 524/529 |
| 3,666,710 | 5/1972 | Makhlouf et al. | 524/461 |
| 3,842,010 | 10/1974 | Pappas et al. | 252/51.5 R |
| 3,876,603 | 4/1975 | Makhlouf | 523/210 |
| 3,941,709 | 3/1976 | Herber et al. | 252/56 R X |
| 4,075,141 | 2/1978 | Portet, Jr. et al. | 524/56 |
| 4,147,688 | 4/1979 | Makhlouf et al. | 524/461 |
| 4,242,384 | 12/1980 | Andrew et al. | 427/421 |
| 4,461,713 | 7/1984 | Anzenberger | 252/52 R X |
| 4,480,069 | 10/1984 | Theodore et al. | 524/504 |
| 4,493,914 | 1/1985 | Chattha | 523/463 X |

Primary Examiner—Patrick P. Garvin
Attorney, Agent, or Firm—Lorraine S. Melotik; Roger L. May

[57] ABSTRACT

This invention is directed to acid neutralizer additives for engine oils, which additive comprise polymeric particle bearing amine functionality on the polymerized particle and a non-polar polymeric stabilizer attached thereto.

14 Claims, No Drawings

AMINE BEARING POLYMERIC PARTICLES AS ACID NEUTRALIZERS FOR ENGINE OILS

Reference is made to commonly assigned and concurrently filed U.S. application Ser. No. 689,401, entitled "Polymeric Particle Acid Neutralizers with Reactive Epoxy Core for Engine Oils" to Theodore et al.

TECHNICAL FIELD

This invention is directed to acid neutralizing additives for engine oils. In particular, this invention is directed to such additives which comprise polymeric particles with a reactive amine polymer core and a non-polar, stabilizer shell.

BACKGROUND OF THE INVENTION

Lubricating oils for gasoline-fueled internal combustion engines are usually formulated with a number of additives for enhancing their performance in service. In order to reduce corrosive engine wear due to the attack by acids resulting from incomplete fuel combustion or oil deterioration, lubricants containing alkaline materials are employed. Among the principal additives are overbased sulfonate and phenate salts of alkaline earth metals. Commercially available additive concentrates are commonly colloidal suspensions of calcium or magnesium carbonate in an oil solution of calcium sulfonate having long non-polar chains. These overbased materials are stable dispersions with a maximum particle size of 100 angstroms. However, calcium carbonate particles are undesirably abrasive.

Recent interest in the development of methanol-fueled passenger vehicles has shown that currently available lubricating oil systems are not adequate for lubrication of methanol-fueled spark ignition engines. Formic acid generated by the incomplete combustion of methanol fuel may cause excessive piston ring and cylinder bore wear on engines operating at low temperatures. Although methanol-fueled engine development has continued with existing lubricating oils, the need for more effective lubricants has lately become very clear.

BRIEF DESCRIPTION OF THE INVENTION

The invention of this application is directed to a polymeric particle acid neutralizing oil additive bearing amine functionality and a lubricating oil composition comprising this additive. The lubricating oil composition comprises a major proportion of lubricating base oil and about 0.1 to 15 weight percent of the acid neutralizing additive. The acid neutralizing additive of this invention comprises polymer particles (a) bearing amine functionality and (b) having a diameter of between about 500 Å–10,000 Å. These amine bearing particles are formed by reacting polymer particles bearing pendant epoxide groups with a secondary amine in an amount so as to react essentially all of the epoxide groups on the epoxide bearing polymer particles with the secondary amine. The polymer particles bearing pendant epoxide groups are formed by free radical addition polymerization of:

(a) between about 50 and 100 weight percent of ethylenically unsaturated monomers bearing a pendant epoxide group; and (b) 0 up to about 50 weight percent of other monoethylenically unsaturated monomers, in the presence of (I) a non-polar organic liquid which is a solvent for the polymerizable monomers, but a non-solvent for the resultant polymer, and (II) polymeric dispersion stabilizer containing at least two segments with one segment being solvated by the non-polar organic liquid and the second segment being of different polarity than the first segment and relatively insoluble in the non-polar organic liquid, which second segment of the stabilizer is chemically attached to the polymerized particle. Optionally, the stabilizer may also bear epoxide groups.

Preferably, the particles have a diameter, on average, of between about 500–3500 Å.

One advantage of the acid neutralizing oil additive of the invention of this application is that the additive in addition to neutralizing acidic components in engine oils such as formic acid, it also acts as a dispersant.

Still another advantage of the additive of this invention is that the outer shell stabilizer oligomers of the particles are inherently effective lubricants.

DETAILED DESCRIPTION OF THE INVENTION

This invention relates to an amine functional polymeric acid neutralizing oil additive and to lubricating oil compositions comprising lubricating base oils and this additive. The lubricating base oil used in this invention may be a synthetic oil, straight mineral lubricating oil or distillates derived from paraffinic, naphthenic, asphalic or mixed based crude, or if desired, various blends of these oils may be employed. This additive as well as optional materials which may be incorporated into the lubricating oil composition of this invention will be discussed hereinafter in greater detail.

The acid neutralizing additive employed in this invention comprises polymer particles (a) bearing amine functionality and (b) having a diameter of about 500 Å–10,000 Å, preferably, on average, a diameter of between about 500 Å–3500 Å. Since the polymer particles of this invention comprise the polymerized particle and the stabilizer attached thereto, the diameter of the particles includes that of the core (formed by the polymerized monomers) and the surrounding stabilizer shell. The particles are formed by reacting polymer particles bearing pendant epoxide groups with a secondary amine. The polymer particles bearing pendant epoxide groups are formed by the free radical addition polymerization of: (a) between about 50 and about 100 weight percent of ethylenically unsaturated monomers bearing an epoxide group, and (b) 0 up to about 50 weight percent of other ethylenically unsaturated monomers, in the presence of: (I) a non-polar organic liquid which is a solvent for the polymerizable monomer, but a non-solvent for the resultant polymer and (II) polymeric dispersion stabililzer containing at least two segments, with one segment being solvated by the non-polar organic liquid and the second segment being of different polarity than the first segment and relatively insoluble in the non-polar organic liquid, which second segment of the stabilizer is chemically attached to the polymerized particle.

The polymerizable monomers forming the epoxide bearing polymerized particle (hereinafter referred to as the epoxy particle) comprise an ethylenically unsaturated monomer bearing an epoxide group. Exemplary of such monomers are glycidyl ethers, such as allyl glycidyl ether and glycidyl esters of acrylic and methacrylic acid, i.e., glycidyl acrylate and glycidyl methacrylate. Preferably, the ethylenically unsaturated epoxide bearing monomers employed to form the epoxide particle is selected from glycidyl acrylate and glycidyl methacrylate. These epoxide group containing monomers comprise between about 50 and about 100 weight percent of the monomers used to form the particle, preferably they comprise greater than about 80 weight percent of the monomers forming this particle. As would be apparent to those in the art, a mixture of such monomers may be employed as this monomer component in forming the epoxy particle. Optionally up to about 50 weight percent of the monomers which are copolymerized to form the epoxy particle may be other ethylenically unsaturated monomers. Exemplary of such monomers are the alkyl esters of acrylic and methacrylic acid, particular those having about 1 to about 4 carbons in the alkyl group. Representative of such compounds are alkyl acrylates, such as methul acrylate, ethyl acrylate, propyl acrylate and the similar alkyl methacrylates. Other ethylenically unsaturated monomers which may be employed include, for example, the vinyl aromatic hydrocarbons, such as styrene, alpha-methyl styrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile and the like. These other ethylenically unsaturated monomers may also include doubly unsaturated monomers such as butadiene which are capable of polymerizing in a vinyl-type manner. As will be appreciated by one skilled in the art, a mixture of these other ethylenically unsaturated monomers may be employed in such particle formation. Preferably, the polymerized particle formed is not a crosslinked particle, however it may be lightly crosslinked by including ethylenically unsaturated monomers which contain a pendant group reactive with the epoxide group of the particle forming monomers, e.g., an acid group. Thus, by including in the epoxy particle forming monomers a small amount of a monomer such as methacrylic acid, the particle may be lightly crosslinked. Monomers of this type which would crosslink the particle are preferably not included in particle formation, but when included, are only included in an amount of up to about 2 weight percent, preferably in an amount less than about 1 weight percent of the polymerizable monomers forming the particle. By not crosslinking or only lightly crosslinking the particles as described, the particles are more permeable to the base oil to which they are employed and thus will be more effective as acid neutralizing additives therein.

The ethylenically unsaturated monomer or monomers are polymerized in a dispersing liquid which solubilizes the monomers but in which the resulting polymers are essentially not soluble and form dispersed polymer particles. The non-solvent is generally a hydrocarbon medium consisting essentially of liquid aliphatic hydrocarbons. A pure aliphatic hydrocarbon or a mixture of two or more be employed. To the extent that any particular polymer produced is mostly insoluble in the hydrocarbon medium resulting, the essentially aliphatic hydrocarbon may be modified by the incorporation of other solvent materials such as aromatic or naphthenic hydrocarbons, and in certain instances the amount of such non-aliphatic component may attain as high as 49 percent by weight of the entire liquid medium. However, the liquid medium preferably consists essentially of aliphatic hydrocarbons and, in general, the compositions of the present invention contain less than 25 percent by weight based on the weight of the liquid medium of an aromatic hydrocarbon and often none at all at this stage.

It is essential that the hydrocarbon be of liquid character, but it may have a wide boiling range from a minimum of about 30° C. (in which case high pressures may be needed in the polymerization) to a maximum which may be as high as 300° C. For most purposes, the boiling point should be from about 50° up to about 235° C. A great many such non-polar solvents are available and known to those skilled in the art. Exemplary of such solvents which may be employed in forming the acid neutralizing additive particles are heptane, octane, and hexane and such commercially available solvents as VM & P Naphtha, Lacolere (both available from Ashland) and Isopar (available from Exxon).

The dispersion stabilizer used in this invention to form the epoxy particle contains at least two segments, one segment being solvated by the non-polar organic liquid and the second segment being of different polarity than the first segment and relatively insoluble in the non-polar organic liquid. This second segment of the stabilizer is chemically attached to the polymerized particle. The polymeric dispersion stabilizer attaches to the polymer core of the particle during epoxy particle formation by means of pendant groups, e.g., ethylenic unsaturation, hydroxyl, carboxyl, on the second segment which may react with the ethylenically unsaturated monomers in the polymerization process used to make the dispersed epoxy particle. Preferably such chemical attachment is by way of addition copolymerization of the ethylenically unsaturated monomers used to prepare the epoxy particle with the ethylenic unsaturation on the second segment of the polymeric dispersion stabilizer. However such chemical attachment may include that formed by reaction between other reactive groups respectively present on the particle monomers and the second segment of the stabilizer, e.g., epoxide and carboxyl. Various types of such polymeric dispersion stabilizers are well known in the art. U.S. Pat. Nos. 3,666,710, 4,147,688, 3,876,603 to Makhlouf et al teach dispersion stabilizers which are generally polymeric and contain two segments, with one segment being solvated by the dispersion liquid and the second segment being of different polarity than the first segment, and relatively insoluble, compared to the first segment, in the dispersion medium. Included among the dispersion stabilizers in the Makhlouf patents are polyacrylates and methacrylates, such as (poly)lauryl methacrylates, and poly(2-ethylhexylacrylate); diene polymers and copolymers such as polybutadiene and degraded rubbers; aminoplast resins, particularly highly naphtha tolerant compounds such as melamine formaldehyde resins etherified with higher alcohols (e.g., alcohols having 4 to 12 carbon atoms); and various copolymers designed to have desired characteristics. (See column 5, lines 1–27 of U.S. Pat. No. 4,147,688). Another dispersion stabilizer which may be employed in this invention comprise those taught by Clarke et al in U.S. Pat. No. 3,607,821 wherein the stabilizer is chemically reacted with dispersed particles of a dispersion (column 1, lines 36–42). Each coreacted stabilizer molecule forms from 1 to 10 (preferably 1 to 4) covalent links with disperse polymer. The covalent links between the stabilizer and disperse polymer is formed by coreaction between chemical groups provided by the stabilizer and complementary chemical groups provided by the disperse polymer or by copolymerization reaction (column 1, lines 63–67). Other suitable dispersion stabilizers for use in this invention are taught in U.S. Pat. No. 4,075,141 to Porter, Jr. et al, U.S. Pat. No. 3,317,635 to Osmond, U.S. Pat. No. 4,242,384 to Andrew et al, and U.S. Pat. No. 3,383,352, to Duell et al. Still other polymeric dispersion stabilizers which may be employed in the invention of this application include those taught in U.S. Pat. No. 4,480,069 to Theodore et al and the stabilizers taught in the applications referenced therein at column 1, lines 6-23: U.S. applications Ser. No. 455,696, now U.S. Pat. No. 4,533,695 entitled "Non-aqueous Dispersions Based on Capped Stabilizers and Reactants Comprising Polyfunctional Monomers II", Ser. No. 455,687, now U.S. Pat. No. 4,528,317 entitled "Non-aqueous Dispersions Based on Capped Stabilizers and Vinyl Monomers II", and Ser. No. 455,701 now U.S. Pat. No. 4,530,957, entitled "Non-aqueous Dispersions Based on Capped Stabilizers and Reactants Comprising Polyfunctional Monomers I", all to Theodore et al and filed on Jan. 5, 1983. Further reference is made to commonly assigned related U.S. applications, Ser. No. 468,901 entitled "Preparation of Non-aqueous Dispersions with use of Monofunctional Stabilizer" to Chattha et al., Ser. No. 468,902, now U.S. Pat. No. 4,493,914 entitled "Crosslinked Flow Control Additives for High Solids Paints II" to Chattha, and Ser. No. 468,912, now U.S. Pat. No. 4,533,681, entitled "Crosslinked Flow Control Additives for High Solids Paints I" to Cassatta et al, all filed Feb. 23, 1983. The stabilizers taught in the Theodore et al patent and in the noted applications, contain pendant groups capable of copolymerizing with the ethylenically unsaturated monomers used to form the particles of the dispersion. However, Theodore et al teach that the reaction between the stabilizer and the polymerized particles may include that between other reactive groups respectively present on the particle monomers and dispersion stabilizer. The above discussed patents and applications are herein expressly incorporated by reference for their teachings relative various dispersion stabilizers, which stabilizers may be employed in the invention of this application.

The preferred dispersion stabilizers taught by Makhlouf in U.S. Pat. No. 4,147,688 are graft copolymers comprising two types of polymer components wherein the first component comprises the condensation reaction product of 12-hydroxystearic acid reacted with glycidyl methacrylate. The second polymeric segment of the stabilizer is formed by reacting the first segment with methyl methacrylate, glycidyl methacrylate, and subsequently methacrylic acid. This second segment thus contains ethylenic groups copolymerizable with the acrylic monomers employed to form the particle. A preferred dispersion stabilizer taught by Theodore et al in U.S. Pat. No. 4,480,069 comprises a first segment of a capped poly(12-hydroxystearic acid) reacted with glycidyl methacrylate, which first segment is subsequently reacted with methyl methacrylate, hydroxyethyl methacrylate, and subsequently isocyanatoethyl methacrylate to provide vinyl groups on the second segment which are copolymerizable with the monomers forming the particle. These polymeric stabilizers described above are simply exemplary of the type of polymeric stabilizers which may be employed in the invention of this application.

It has also been found that the acid neutralizing ability of the particles in the lubricating oil can be increased by introducing epoxide groups, into the stabilizer which surrounds the polymerized particle, i.e., in addition to that present in the epoxy core of the particle. This can be done by including a glycidyl functional monomer in addition to those used to form the second segment of the stabilizer, so that epoxide groups remain as pendant functionality on the second segment of the stabilizer. As noted above, in U.S. Pat. No. 4,480,069 the second segment of the stabilizer could be made by reacting the first segment with methyl methacrylate and hydroxyethyl methacrylate, and then reacting this graft copolymer with isocyanatoethyl methacrylate. If one wishes to introduce epoxide groups in the second segment of the stabilizer, glycidyl methacrylate could be included with the methyl methacrylate and the hydroxyethyl methacrylate to form the graft copolymer which would be subsequently reacted with the isocyanatoethyl methacrylate. Thus not only would ethylenically unsaturation be generated on the second segment by reaction of the hydroxyethyl methacrylate with the isocyanatoethyl methacrylate, in addition pendant epoxide groups would be present from the incorporation of glycidyl methacrylate. If epoxide groups are introduced into the stabilizer, they are present in a minor amount as compared to that present in the particle core. Generally, no more than about 10% by weight of the monomers used to form the second segment, as exemplified above, would be glycidyl functional monomers, e.g. glycidyl methacrylate. While this preferred stabilizer of Theodore et al has been used to illustrate one way in which epoxide groups may be present in the stabilizer, this invention is not meant to be limited to this embodiment for incorporating epoxide groups on the stabilizer. Other stabilizer embodiments, which may be modified so as to contain pendant epoxide groups would be apparent to and within the skill of those in the art.

The polymers of this invention bearing amine functionality are formed by reacting the particles bearing epoxide groups formed as described above with a secondary amine in an amount so as to react essentially all of the epoxide groups on the epoxide bearing polymer particles (i.e. including the epoxide groups on the polymerized particles and any epoxide groups which may be present on the stabilizer) with the secondary amine. Exemplary of second amines which may be employed include, but are not limited to, diethylamine, dibutylamine, diethanolamine and N-methyletharolamine. A single secondary amine or a mixture of such amines may be employed in this invention. To form the amine functional particles, the secondary amine is combined and reacted with the particles bearing epoxide groups, generally in dispersion, at temperatures necessary to complete the reaction.

The particles of this invention may be left as dispersions in the solvent employed in particle formation or the solvent employed in particle formation may be removed. These particles, when present as dispersions in the solvent or as a dry powder, can be employed as acid neutralizers in oil compositions. Generally, however, when employed as an oil additive, the particles would be left as a dispersion in the solvent in which they were formed, and employed as a additive "concentrate".

The lubricating oil composition of this invention may also include other additives, commonly employed in oil formulations such as pour point depressants, rust inhibitors, detergents, foam depressants and additives which are included for their antioxidant and antiwear properties.

Although the oil additive of this invention has been described as useful in lubricating oils employed in engines running on methanol containing fuels, the use of the additive and oil composition containing the additive of this invention is not limited to such use. They may be employed wherever a lubricating oil composition have good acid neutralizing properties is desired.

The following examples are presented by way of description of the composition of the invention and set forth the best mode contemplated by the inventor but are not to be construed as limiting.

EXAMPLE 1

Amine-bearing polymeric dispersions can be prepared from epoxy-functional dispersions according to following scheme:

Capped poly(12-hydroxystearic acid): 12-hydroxystearic acid (2410.00 g) and xylene (500.00 g) were heated to obtain a solution. Tetraisopropyl titanate (1.50 g Tyzor TPT, DuPont) was added to the solution and refluxed for 30 hours under a Dean-Stark water separator to collect 106.00 g water. Fifty grams of stearic acid were added to the reaction mixture and refluxing was continued for ten hours until no more water was collected. Infrared spectrum of product showed complete disappearance of the hydroxy absorption band. The molecular weight $(M_w/M_n)$ of product was 4195/2110=1.99.

Macromonomer: One gram of Cordova accelerator AMC TM 2 was added to the above solution and heated to 75° C. Glycidyl methacrylate (158.00 g) was added dropwise to the solution with continuous stirring. The reaction mixture was stirred at 75° C. for two hours and at 85° C. for sixteen hours. Infrared spectra of the product displayed hydroxy absorption band (3350–3600 cm$^{-1}$) but the glycidyl group band (916 cm$^{-1}$) was not present. Its molecular weight was $M_w/M_n=4420/2220$ and its solids content was 72%.

Stabilizer Precursor and Stabilizer: The monomers (253.70 g macromonomer II, 187.00 g methyl methacrylate and 22.50 g hydroxyethyl methacrylate) and 5.00 g AIBN in 70.00 g butyl acetate were combined and added dropwise to the refluxing butyl acetate (213.00 g) in 4.5 hours under nitrogen. 2,2′-Azobis(2-methylpropionitrile) (AIBN, 1.00 g in 30.00 g butyl acetate) was added to the reaction mixture and refluxing was continued for two additional hours. To the above stabilizer precursor solution hydroquinone (HQ, 0.66 g in 10.00 g butyl acetate and 10.00 g heptane) was added. After cooling the reaction mixture to 60° C., 0.25 g dibutyltin dilaurate (DBTDL) and 6.50 g isocyanatoethyl methacrylate (IEM) dissolved in aliphatic hydrocarbon (50.00 g, b.p. 127°–140° C.) were added dropwise. The mixture was stirred at 60° C. until the isocyanate group disappeared completely as indicated by infrared spectra (2270 cm$^{-1}$). The stabilizer solution was diluted with aliphatic hydrocarbon (B.P. 127°–140° C.) to a solids content of 42%. The molecular weight $(M_w/M_n)$ of the product was 17400/7330=2.40.

Preparation of Nonaqueous Dispersion: In a two-liter flask equipped with condenser, gas inlet tube, thermometer, sample port and mechanical stirrer was charged 355 g heptane. As the temperature was raised to the boiling point of heptane, glycidyl methacrylate (14.00 g), stabilizer (3.10 g) and AIBN (1.00 g) were rapidly poured into the flask. After refluxing the reaction mixture for 40 minutes, the following mixture was added dropwise over a period of three hours under a nitrogen atmosphere: stabilizer (168.00 g), glycidyl methacrylate (320.00 g), 1-octanethiol (3.50 g), (AIBN, 1.50 g), styrene (20.00 g) and aliphatic hydrocarbon (120 g, b.p. 127°–140° C.). After completion of monomer addition, 0.20 g AIBN in a 4.00 g butyl acetate were added. The mixture was refluxed for two additional hours. The solids content was 40.90%, average particle size 0.27 μm and viscosity at 25° C. was 10.10 seconds (Ford Cup #4). The above nonaqueous dispersion (203 g) was placed in round bottom flask and diethylamine (33.00 g) was added rapidly with stirring to the nonaqueous dispersion. The mixture was stirred at room temperature until almost all epoxide groups had disappeared. The amine-functional dispersion was stable and particle size (0.35 μm) and viscosity (10.7 sec.) increased very little.

Oil formulations were prepared by adding the above nonaqueous dispersion to Mobil 1 (base stock) lubricating oil with stirring. The hydrocarbon solvent was removed from the oil composition by heating at 75° C. under vacuum and with stirring for 3 hours. Oil compositions containing 1–3% amine bearing particles were prepared and were stable dispersions.

A lubricating oil (Mobil 1) dispersion (41.20 g) containing 2.6% amine-bearing particles was heated to 78° C. To this dispersion was added 0.26 g formic acid and the mixture was kept at 78° C. and was shaken periodically. Samples were withdrawn at regular time intervals and titrated for total base number according to ASTM procedure D-2896-80. About 60% of the amine groups had disappeared after 70 hours of reaction at 78° C.

EXAMPLE 2

The precedure of Example 1 was repeated with the exception in the preparation of amine-bearing particles. The epoxy functional dispersion of Example 1 (150.00 g) was placed in a round bottom flask and diethyl amine (22.50 g) was added rapidly at room temperature with stirring. The temperature was raised to 50° C. and stirring was continued until all the epoxide groups reacted (over 90% conversion in 8 hours). The amine functional dispersion had excellent self stability. Its solids content was 42.50%, average particle size 0.33 μm and viscosity was 10.8 sec. (Ford cup #4).

Oil formulations containing 1–5% amine bearing particles were prepared. They were stable at room temperature and neutralized formic acid (ASTM D-2896-80).

EXAMPLE 3

Example 2 was repeated with the exception that Mobil 1 base stock-amine particle formulations contained 5–10% particles. These dispersions were stable and suitable for neutralizing formic acid at room and elevated temperatures.

EXAMPLE 4

Capped(12-hydroxystearic acid) was prepared by heating 12-hydroxystearic acid (2410.00 g) stearic acid (100.00 g) and xylene (500.00 g) to obtain a solution. Tetraisopropyl titanate ("Tyzor" TPT, 1.50 g) was added to the solution and the mixture was refluxed under a Dean-Stark water separator until no more water was released. Infrared spectrum of the product showed complete disappearance of the hydroxy absorption band, the molecular weight $(M_w/M_n)$ was 4030/2015=2.00. The stabilizer precursor, stabilizer, the epoxy functional and amine-bearing dispersions were prepared according to the procedures of Example 2.

Oil formulations containing 1–3% amine-bearing particles in Mobil 1 base stock were stable. They were suitable for neutralizing organic acids such as formic and acetic acid.

EXAMPLE 5

The procedure of Example 1 was repeated with the exception in the preparation of amine-bearing particles from epoxy-functional particles. The epoxy nonaqueous dispersion of Example 1 (42.00 g) was combined with diethanol amine (10.00 g) with stirring at room temperature. The mixture was stirred at 25° C. for ninety hours and all of the epoxy groups reacted with the amine. The hydroxy amine has a small catalytic effect on the amine-epoxy reaction.

Oil formulations prepared as in Example 1 were stable and neutralized formic acid.

EXAMPLE 6

Example 1 was repeated with the exception in the preparation of amine-bearing particles from epoxy-functional particles. The nonaqueous dispersion containing epoxy particles (125.50 g) was placed in a one-liter flask. Diethanol amine (30.00 g) was combined with aliphatic hydrocarbon (20.00 g), b.p. 127°–140° C.) and the mixture was added to the dispersions in 20 minutes with stirring at room temperature. The mixture was heated to 50° C. and stirred at 50° C. for 9 hours. The epoxy group reacted with the diethanol amine completely. The particle size and viscosity of amine-bearing particles were similar to those epoxy particles.

Oil formulations containing the amine-bearing particles were stable and capable of neutralizing organic acids such as formic and acetic acid.

EXAMPLE 7

Example 2 was repeated with the exception that the epoxy-functional dispersion was prepared from the following mixture of monomers: stabilizer (168.00 g), glycidyl methacrylate (340.00 g), 1-octanethiol (3.50 g), AIBN (1.50 g) and aliphatic hydrocarbon (120.00 g), b.p.=127°–140° C.). Equimolar amounts of the epoxy dispersion were combined with diethanol amine as in Example 2.

Oil formulations containing 1–5% amine-bearing particles were stable and neutralized organic acids.

EXAMPLE 8

The stabilizer precursor of Example 1 was prepared by copolymerizing the following monomer mixture: macromonomer (224.00 g), methyl methacrylate (160.00 g), hydroxy ethyl methacrylate (10.00 g) glycidyl methacrylate (56.00 g) and AIBN (5.00 g). The stabilizer and nonaqueous dispersion are prepared as in Example 1. The amine-bearing particles are prepared as in Example 6 by combining 148.50 g of epoxy-functional particles with 30.00 g of diethanolamine. Oil formulations containing 3.00% amine-bearing particles were stable and neutralized formic acid efficiently.

EXAMPLE 9

Example 1 was repeated with the exception in the preparation of stabilizer precursor and stabilizer. The monomers (220.00 g macromonomer, 170.00 g methyl methacrylate and 50.00 g glycidyl methacrylate) and 5.00 g AIBN were combined and added dropwide to the refluxing butyl acetate (210.00 g) in four hours under nitrogen atmosphere. After monomer addition was complete, AIBN (1.00 g) was added to the reaction mixture and it was refluxed for 2.5 additional hours. The solids content of stabilizer precursor was 53.50% and its molecular weight ($M_w/M_n$) was 10350/4910. Hydroquinone (0.60 g in 10.00 g butyl acetate) was added to the stabilizer solution. After raising the temperature of reaction mixture to 120° C., 0.25 g dimethyl dodecyl amine and 4.00 g methacrylic acid dissolved in aliphatic hydrocarbon (40.00 g, b.p. 127°–140° C.) were added rapidly. The mixture was refluxed for seven hours. The above stabilizer was employed in preparing nonaqueous dispersions as in Example 6. The oil formulations containing 1–4% amine-bearing particles were stable and neutralized formic acid.

EXAMPLE 10

The procedure of Example 2 was repeated with the exception that diethyl amine was replaced by an equimolar amount of dibutyl amine. The amine-bearing particles were dispersed in Mobil 1 base stock.

EXAMPLE 11

The procedures of Example 1 are repeated with the exception that the particles were dispersed in a lubricating oil having an SAE viscosity grade of 1O w. The formulation was suitable for neutralizing organic acids such as formic and acetic acid.

EXAMPLE 12

Example 2 was repeated with the single exception that the particles are dispersed in a paraffinic base oil having a SUS viscosity of about 130° at 100° F. The lubricating oil dispersion was capable of neutralizing formic acid.

EXAMPLE 13

The procedure of Example 5 was repeated with the exception that the dispersion was combined with a synthetic ester oil lubricant made by reacting pentaerythritol with an equimolar mixture of valeric and pelargonic acids. The dispersion was suitable for neutralizing organic acids.

EXAMPLE 14

Example 6 were repeated with the single exception that the particles were dispersed in a 50:50 mixture of Mobil 1 base stock and a synthetic ester oil lubricant (Example 13). The formulation was capable of reacting with formic acid.

EXAMPLE 15

The experimental procedures of Example 1 are repeated with the exception that diethylamine is replaced by an equimolar amount of N-methylethanolamine. The lubricating oil dispersion was found suitable for neutralizing formic acid.

EXAMPLE 16

Example 1 was repeated with the exception that a different material was employed in the stabilization of particles. Heptane-aliphatic hydrocarbon (b.p.127°–140° C. heptane-aliphatic hydrocarbon weight ration=77/23) was charged under nitrogen in a round bottom flask as in example 1. As the solvent was brough to reflux, the following monomer mixture was added dropwise over a period of three hours: 90.00 g. macromonomer: 160 g glycidyl methacrylate, 1.75 g 1-octomethiol, 0.70 g AIBN and 60 g aliphatic hydrocarbon (b.p.127°–140° C.). The resulting particles were reacted with diethylamine as in Example 1. Oil formulations (Mobil 1 base stock) comtaining these amine-bearing particles were stable and capable of reacting with formic acid.

EXAMPLE 19

The procedures of example 1 were repeated with the exception in the preparation of macromonomer. One gram of Cordova Accelerator AM ™ 2 was added to a poly (12-hydroxy stearic acid) (2410 g, $M_n = 1730$) solution (72% solids) and heated to 75° C. Glycidyl methacrylate was reacted wit the poly acid as in Example 1. The stabilizer, epoxy particles and amine-bearing particles were prepared as in Example 1. Oil formulations containing these particles were prepared.

In view of the disclosure, many modifications of this invention will be apparent to those skilled in the art. It is intended that all such modifications which falls within the true scope of this invention be included within the terms of the appended claims.

We claim:

1. An acid neutralizing lubricating oil additive comprising polymer particles (a) bearing amine functionality and (b) having a particle diameter of between about 500 Å and 10,000 Å, which amine functional polymer particles are formed by reacting polymer particles bearing pendant epoxide groups with a secondary amine in an amount so as to react essentially all of said epoxide groups on said epoxide bearing polymer particles with said secondary amine, wherein said polymer particles bearing pendant epoxide groups are formed by the free radical addition polymerization of:
   (a) between about 50 and about 100 weight percent of ethylenically unsaturated monomers bearing an epoxide group, and
   (b) 0 up to 50 weight percent of other monethylenically unsaturated monomers; in the presence of: (I) a non-polar organic liquid which is a solvent for the polymerizable monomers, but a non-solvent for the resultant polymer, and (II) polymeric dispersion stabilizer containing at least two segments, with one segment being solvated by said non-polar organic liquid and the second segment being of different polarity than said first segment and relatively insoluble in said non-polar organic liquid, which said second segment of said stabilizer is chemically attached to the polymerized particle.

2. An additive according to claim 1, wherein said secondary amines are selected from diethylamine, dibutylamine, diethanolamine and N-methylethanolamine.

3. An additive according to claim 1, wherein said polymerizable monomers bearing an epoxide group are selected from (a) glycidyl ethers, and (b) glycidyl esters of acrylic and methacrylic acids.

4. An additive according to claim 1, wherein said ethylenically unsaturated monomers bearing an epoxide group comprise greater than 80 weight percent of said polymerizable monomers forming said epoxide bearing particles.

5. An additive according to claim 1, wherein said polymeric stabilizer is chemically attached to said epoxide bearing polymerized particle during particle formation through reaction of said polymerizable monomers with reactive groups present on said second segment of said stabilizer, which reactive groups comprise groups capable of (a) reacting with epoxide groups or (b) copolymerizing with ethylenically unsaturated monomers.

6. An additive according to claim 5, wherein said reactive groups are selected from ethylenic unsaturation, carboxyl groups, and hydroxyl groups.

7. An additive according to claim 1, wherein said polymer particle diameter is, on average, between about 500–3500 Å.

8. A lubricating oil composition comprising a major proportion of a lubricating base oil and about 0.1 to 15 weight percent of an acid neutralizing additive which comprises polymer particles (a) bearing pendant amine groups, and (b) having a diameter of about 500 Å and 10,000 Å, which amine functional particles are formed by reacting polymer particles bearing pendant epoxide groups with a secondary amine in an amount so as to react essentially all of said epoxide groups on said epoxide bearing polymer particles with said secondary amine, wherein said polymer particles bearing pendant epoxide groups are formed by the free radical addition polymerization of:
   (a) between about 50 and about 100 weight percent of an ethylenically unsaturated monomers bearing an epoxide group, and
   (b) 0 up to about 50 weight percent of other monoethylenically unsaturated monomers; in the presence of: (I) a non-polar organic liquid which is a solvent for the polymerizable monomers, but a non-solvent for the resultant polymer, and (II) polymeric dispersion stabilizer containing at least two segments, with one segment being solvated by said non-polar organic liquid and the second segment being of different polarity than said first segment and relatively insoluble in said non-polar organic liquid, which said second segment of said stabilizer is chemically attached to the polymerized particle.

9. A lubricating oil composition according to claim 10, wherein said secondary amines are selected from diethylamine, dibutylamine, diethanolamine and N-methylexthanolamine.

10. A lubricating oil composition according to claim 8, wherein said monomers bearing an epoxide group are selected from (a) glycidyl ethers, and (b) glycidyl esters of acrylic and methacrylic acids.

11. A lubricating oil composition according to claim 8, wherein said ethylenically unsaturated monomers bearing an epoxide group comprise greater than 80 weight percent of said monomers forming said particles.

12. A lubricating oil composition according to claim 8, wherein said polymeric stabilizer is chemically attached to said polymerized particle during particle formation through reaction of said polymerizable monomers with reactive groups present on said second segment of said stabilizer, which reactive groups comprise groups capable of (a) reacting with epoxide groups or (b) copolymerizing with ethylenically unsaturated monomers.

13. A lubricating oil composition according to claim 12, wherein said reactive groups are selected from ethylenic unsaturation, carboxyl groups, and hydroxyl groups.

14. A lubricating oil composition according to claim 8, wherein said particle diameter is, on average, between about 500–3500 Å.

* * * * *